United States Patent
Radha et al.

(10) Patent No.: US 12,086,933 B2
(45) Date of Patent: Sep. 10, 2024

(54) LIDAR CAMERA FUSION FOR AUTONOMOUS VEHICLES

(71) Applicant: Board of Trustees of Michigan State University, East Lansing, MI (US)

(72) Inventors: Hayder Radha, East Lansing, MI (US); Su Pang, Okemos, MI (US); Daniel Morris, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 229 days.

(21) Appl. No.: 17/350,135

(22) Filed: Jun. 17, 2021

(65) Prior Publication Data

US 2022/0406010 A1 Dec. 22, 2022

(51) Int. Cl.
*G06N 3/04* (2023.01)
*G01S 17/86* (2020.01)
*G01S 17/89* (2020.01)
*G01S 17/931* (2020.01)
*G06T 11/00* (2006.01)
*G06T 17/05* (2011.01)

(52) U.S. Cl.
CPC ............. *G06T 17/05* (2013.01); *G01S 17/86* (2020.01); *G01S 17/89* (2013.01); *G01S 17/931* (2020.01); *G06T 11/00* (2013.01); *G06T 2210/12* (2013.01)

(58) Field of Classification Search
CPC ...... G06N 3/045; G06N 20/00; G06N 3/0464; G06T 2207/10028; G06T 2207/20081; G06T 2207/20221; G06T 2210/12; G06T 7/70; G06T 7/521; G06T 17/05; G06T 11/00; G06T 17/931; G01S 17/931; G01S 17/89; G01S 17/86
See application file for complete search history.

(56) References Cited

U.S. PATENT DOCUMENTS

| 11,010,907 | B1 * | 5/2021 | Bagwell | G06V 20/56 |
| 2019/0265714 | A1 * | 8/2019 | Ball | G05D 1/0221 |

FOREIGN PATENT DOCUMENTS

| CN | 113111978 A | * | 7/2021 | ............ G06K 9/6267 |
| TW | 202028778 A | * | 8/2020 | ............. G01S 13/60 |

OTHER PUBLICATIONS

Chabot, et al., Deep Manta: A Coarse-to-Fine Many-Task Network for Joint 2D and 3D Vehicle Analysis from Monocular Image, 2017 IEEE Conference on Computer Vision and Pattern Recognition (CVPR), 2017, https://doi.org/10.1109/cvpr.2017.198.

(Continued)

*Primary Examiner* — Weiming He
(74) *Attorney, Agent, or Firm* — Harness, Dickey & Pierce, PLC (57) ABSTRACT

A method and system of operating a vehicle includes a first sensor generating first sensor data for an object comprising a first bounding box from a first sensor. The first sensor data comprising a first confidence score. A second sensor generates second sensor data for the object comprising a second bounding box from a second sensor different than the second sensor. The second sensor data comprises a second confidence score. A bounding box circuit is programmed to generate a third confidence score for the object based on the first sensor data and the second sensor data and utilize the first sensor data, the second sensor data and the third confidence score to control operation of a vehicle system.

12 Claims, 8 Drawing Sheets

(56) References Cited

OTHER PUBLICATIONS

Mousavian, et al., 3D Bounding Box Estimation Using Deep Learning and Geometry, 2017 IEEE Conference on Computer Vision and Pattern Recognition (CVPR), 2017, https://doi.org/10.1109/cvpr.2017.597.

Garcia-Fernandez, et al., Poisson multi-Bernoulli mixture filter: direct derivation and implementation, IEEE Transactions on Aerospace and Electronic Systems, arXiv:1703.04264v1 [cs.CV], 17 pages, Mar. 13, 2017.

Xia, et al., Performance Evaluation of Multi-Bernoulli Conjugate Priors for Multi-Target Filtering, 2017 20th International Conference on Information Fusion (Fusion), 2017, https://doi.org/10.23919/icif.2017.8009710.

Papi, et al., Multi-Target Track-before-Detect Using Labeled Random Finite Set, 2013 International Conference on Control, Automation and Information Sciences (ICCAIS), 2013, https://doi.org/10.1109/iccais.2013.6720540.

Emami, et al.,Machine Learning Methods for Solving Assignment Problems in Multi-Target Tracking. 1, 1 (Feb. 2018), 35 pages. https://doi.org/0000001.0000001.

Bernardin, et al., Evaluating Multiple Object Tracking Performance: The Clear Mot Metrics, EURASIP Journal on Image and Video Processing, vol. 2008, Apr. 23, 2008, pp. 1-10, https://doi.org/10.1155/2008/246309.

Murty, (1968) Letter to the Editor—An Algorithm for Ranking all the Assignments in Order of Increasing Cost, Operations Research 16(3):682-687, https://doi.org/10.1287/opre.16.3.682.

A random finite set conjugate prior and applicaton to multi target tracking.

Zhou, et al., VoxelNet: End-to-End Learning for Point Cloud Based 3D Object Detection, 2018 IEEE/CVF Conference on Computer Vision and Pattern Recognition, 2018, https://doi.org/10.1109/cvpr.2018.00472.

Yang, et al., STD: Sparse-to-Dense 3D Object Detector for Point Cloud, 2019 IEEE/CVF International Conference on Computer Vision (ICCV), 2019, https://doi.org/10.1109/iccv.2019.00204.

Yan, et al., Second: Sparsely Embedded Convolutional Detection, Sensors, vol. 18, No. 10, Oct. 6, 2018, p. 3337., https://doi.org/10.3390/s18103337.

Nair, et al., Rectified Linear Units Improve Restricted Boltzmann Machines, Proceedings of the 27th International Conference on Machine Learning, Israel, 2010, 8 pages.

Shi, et al., PV-RCNN: Point-Voxel Feature Set Abstraction for 3D Object Detection, 2020 IEEE/CVF Conference on Computer Vision and Pattern Recognition (CVPR), 2020, https://doi.org/10.1109/cvpr42600.2020.01054.

You, et al., Pseudo lidar ++ Accurate depth for 3d object detection in autonomous driving, ICLR 2020, arXiv:1906.06310v3 [cs.CV], Feb. 15, 2020.

Shi, et al., Pointrcnn: 3D Object Proposal Generation and Detection from Point Cloud, 2019 IEEE/CVF Conference on Computer Vision and Pattern Recognition (CVPR), 2019, https://doi.org/10.1109/cvpr.2019.00086.

Lang, et al., Pointpillars: Fast Encoders for Object Detection from Point Clouds, 2019 IEEE/CVF Conference on Computer Vision and Pattern Recognition (CVPR), 2019, https://doi.org/10.1109/cvpr.2019.01298.

Qi, et al., PointNet: Deep Learning on Point Sets for 3D Classification and Segmentation, 2017 IEEE Conference on Computer Vision and Pattern Recognition (CVPR), 2017, https://doi.org/10.1109/cvpr.2017.16.

Xu,, et al., Pointfusion: Deep Sensor Fusion for 3D Bounding Box Estimation, 2018 IEEE/CVF Conference on Computer Vision and Pattern Recognition, 2018, https://doi.org/10.1109/cvpr.2018.00033.

Ren, et al., Faster R-CNN: Towards Real-Time Object Detection with Region Proposal Networks, IEEE Transactions on Pattern Analysis and Machine Intelligence, vol. 39, No. 6, 2017, pp. 1137-1149., https://doi.org/10.1109/tpami.2016.2577031.

Chen, et al. Multi-View 3D Object Detection Network for Autonomous Driving, 2017 IEEE Conference on Computer Vision and Pattern Recognition (CVPR), 2017, https://doi.org/10.1109/cvpr.2017.691.

Liang, et al., Multi-Task Multi-Sensor Fusion for 3D Object Detection, 2019 IEEE/CVF Conference on Computer Vision and Pattern Recognition (CVPR), 2019, https://doi.org/10.1109/cvpr.2019.00752.

Lin, et al., Feature Pyramid Networks for Object Detection, 2017 IEEE Conference on Computer Vision and Pattern Recognition (CVPR), 2017, https://doi.org/10.1109/cvpr.2017.106.

Ku, et al., Joint 3D Proposal Generation and Object Detection from View Aggregation, 2018 IEEE/RSJ International Conference on Intelligent Robots and Systems (IROS), 2018, https://doi.org/10.1109/iros.2018.8594049.

Qi, et al., Frustum Pointnets for 3D Object Detection from RGB-D Data, 2018 IEEE/CVF Conference on Computer Vision and Pattern Recognition, 2018, https://doi.org/10.1109/cvpr.2018.00102.

Wang, et al., Frustum ConvNet: Sliding Frustums to Aggregate Local Point-Wise Features for Amodal 3D Object Detection, 2019 IEEE/RSJ International Conference on Intelligent Robots and Systems (IROS), 2019, https://doi.org/10.1109/iros40897.2019.8968513.

Shi, et al., From Points to Parts: 3D Object Detection from Point Cloud with Part-Aware and Part-Aggregation Network, IEEE Transactions on Pattern Analysis and Machine Intelligence, 2020, pp. 1-1, https://doi.org/10.1109/tpami.2020.2977026.

Lin, et al., Focal Loss for Dense Object Detection, 2017 IEEE International Conference on Computer Vision (ICCV), 2017, https://doi.org/10.1109/iccv.2017.324.

Chen, et al., Fast Point R-CNN, 2019 IEEE/CVF International Conference on Computer Vision (ICCV), 2019, https://doi.org/10.1109/iccv.2019.00987.

Liang, et al., Deep Continuous Fusion for Multi-Sensor 3D Object Detection, Computer Vision, ECCV 2018, 2018, pp. 663-678, https://doi.org/10.1007/978-3-030-01270-0_39.

Cai, et al., Cascade R-CNN: High Quality Object Detection and Instance Segmentation, IEEE Transactions on Pattern Analysis and Machine Intelligence, vol. 43, No. 5, 2021, pp. 1483-1498, https://doi.org/10.1109/tpami.2019.2956516.

Geiger, et al., Are We Ready for Autonomous Driving? The Kitti Vision Benchmark Suite, 2012 IEEE Conference on Computer Vision and Pattern Recognition, 2012, https://doi.org/10.1109/cvpr.2012.6248074.

Ren, et al., Accurate Single Stage Detector Using Recurrent Rolling Convolution, 2017 IEEE Conference on Computer Vision and Pattern Recognition (CVPR), 2017, https://doi.org/10.1109/cvpr.2017.87.

Mottaghi, et al., A Coarse-to-Fine Model for 3D Pose Estimation and Sub-Category Recognition, 2015 IEEE Conference on Computer Vision and Pattern Recognition (CVPR), 2015, https://doi.org/10.1109/cvpr.2015.7298639.

Chen, et al., 3D Object Proposals for Accurate Object Class Detection, Advances in Neural Information Processing Systems 28, NIPS, pp. 1-9, 2015.

Wang, et al., Pseudo-Lidar from Visual Depth Estimation: Bridging the Gap in 3D Object Detection for Autonomous Driving, 2019 IEEE/CVF Conference on Computer Vision and Pattern Recognition (CVPR), 2019, https://doi.org/10.1109/cvpr.2019.00864.

\* cited by examiner

LIDAR CAMERA FUSION FOR AUTONOMOUS VEHICLES

TECHNICAL FIELD

The present disclosure relates generally to a autonomous vehicles, and more specifically, to a method and system for fusing data from a camera and light detection and ranging (lidar) for determining boundaries for objects

BACKGROUND

The statements in this section merely provide background information related to the present disclosure and does not constitute prior art.

Vehicle-accident related facilities, especially those caused by human errors, exceed more than 1 million every year worldwide. Various types of safety measures have proposed by various governmental jurisdictions to reduce the amount of accidents. Autonomous vehicles that are properly equipped are one way to reduce the amount of accidents. Autonomous vehicles typically have a number of sensors that are used for detecting nearby elements within a field of view or surveillance area. Based upon the characterization of the various components, the vehicle may make evasive maneuvers to avoid an accident.

Autonomous driving systems need accurate 3D perception of vehicles and other objects in their environment. Unlike 2D visual detection, 3D-based object detection enables spatial path planning for object avoidance and navigation. Compared to 2D object detection, which has been well-studied, 3D object detection is more challenging with more output parameters needed to specify 3D oriented bounding boxes around targets. However, such systems have not been effective to identify lidar and/or 2D and 3D model detections.

SUMMARY

The present disclosure provides improves three-dimensional (3D) object position using a Camera-Lidar Object Candidates (CLOCs) fusion network. CLOCs fusion provides a low-complexity multi-modal fusion framework that significantly improves the performance of single-modality detectors. CLOCs operates on the combined output candidates before Non-Maximum Suppression (NMS) of any 2D and any 3D detector, and is trained to leverage their geometric and semantic consistencies to produce more accurate final 3D and 2D detection results.

In one aspect of the disclosure, a method of operating a vehicle comprises generating first sensor data for an object comprising a first bounding box from a first sensor. The first sensor data comprises a first confidence score. The method also comprises generating second sensor data for the object comprising a second bounding box from a second sensor different than the second sensor. The second sensor data comprises a second confidence score. The method further includes generating a third confidence score for the object based on the first sensor data and the second sensor data to obtaining a confidence score corresponding to the object and utilizing the first sensor data, the second sensor data and the third confidence score to control operation of a vehicle system.

In a further aspect of the disclosure, a method of operating a vehicle comprises generating two-dimensional sensor data for an object from a two-dimensional sensor. The two-dimensional sensor data comprises at least a first corner and second corner of a first bounding box and a first confidence score. The method further comprises generating three-dimensional sensor data for the object from a three-dimensional sensor comprising a third corner of a second bounding box, a height, width and length of the second bounding box and a second confidence score. The method further comprises generating a confidence score for the object based on the two-dimensional sensor data and the three-dimensional sensor data to obtaining a third confidence score corresponding to the object and utilizing the two-dimensional sensor data, the three-dimensional sensor data and the third confidence score to control operating of a vehicle system.

In a further aspect of the disclosure, a system for operating a vehicle includes a first sensor generating first sensor data for an object comprising a first bounding box from a first sensor. The first sensor data comprising a first confidence score. A second sensor generates second sensor data for the object comprising a second bounding box from a second sensor different than the second sensor. The second sensor data comprises a second confidence score. A bounding box circuit is programmed to generate a third confidence score for the object based on the first sensor data and the second sensor data and utilize the first sensor data, the second sensor data and the third confidence score to control operation of a vehicle system.

Further areas of applicability of the teachings of the present disclosure will become apparent from the detailed description, claims and the drawings provided hereinafter, wherein like reference numerals refer to like features throughout the several views of the drawings.

DRAWINGS

The drawings described herein are for illustration purposes only and are not intended to limit the scope of the present disclosure in any way.

DETAILED DESCRIPTION

Example embodiments will now be described more fully with reference to the accompanying drawings.

Figure 1:
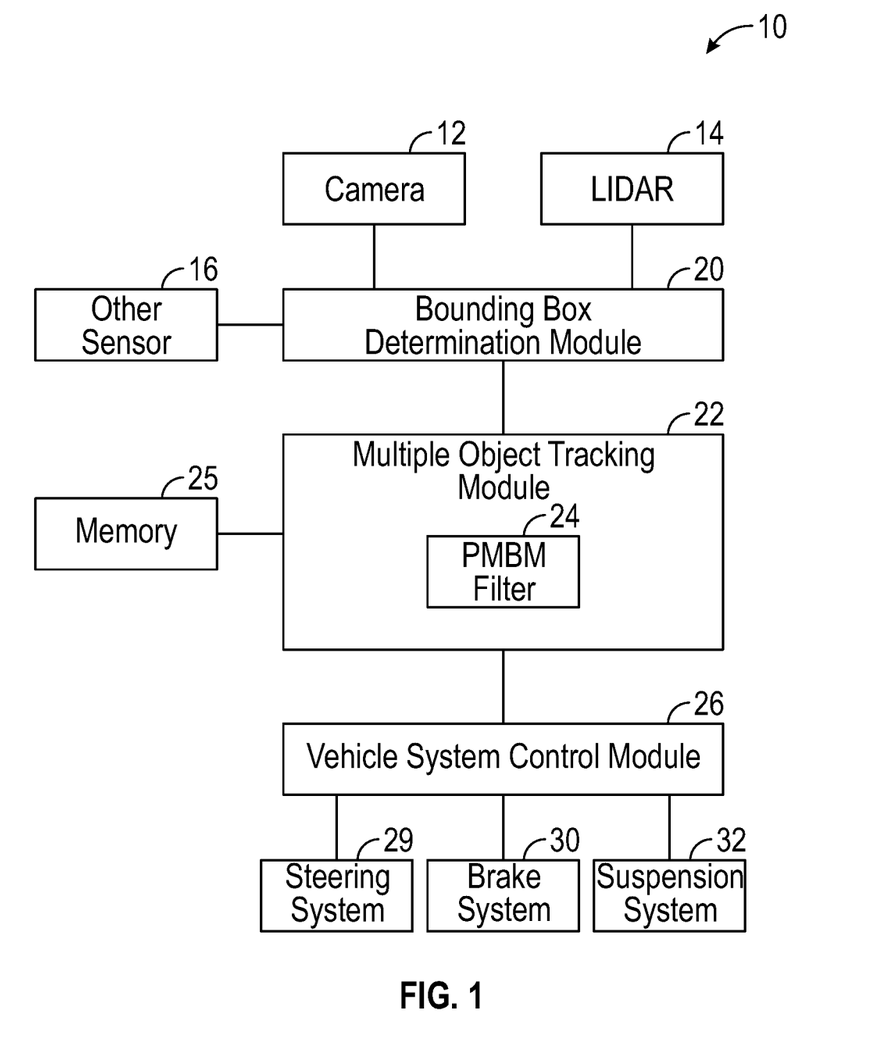
FIG. 1 is a block diagrammatic view of the vehicle according to the present disclosure.

Referring now to FIG. 1, an autonomous vehicle system 10 is illustrated. The autonomous vehicle system 10 includes a camera 12 as an example of a two-dimensional sensor, a lidar 14 and an example of a three-dimensional sensor and other vehicle sensors 16. The camera 12 is used to obtain two-dimensional image data. The lidar 14 is used to obtain three-dimensional image data. Other sensors 16 may include various types of sensors used in autonomous vehicles and other control systems of the vehicle. The other sensors 16 may include radar and vehicle feedback sensors, such as steering wheel angle sensors, braking sensors, attitude and acceleration sensors, safety system sensors and the like.

The camera sensor 12, the lidar sensor 14 and the other sensors 16 may occur singular or in a plurality to the bounding box determination circuit 20. The bounding box determination circuit 20 provides a multi-object tracking circuit with various types of data derived from the sensors 12, 14 and 16. The bounding box determination circuit 20 may provide a length, width and height of a particular object. Likewise, the bounding box determination circuit 20 may provide a center and the velocity of the center of movement in various directions such as in the X direction, Y direction and possibly the Z direction.

In the operation of autonomous vehicles, the ability to process the data in a reasonable amount of time so that computations and evasive actions may take place is important. A vehicle system control circuit 26 uses the vehicle data to control the trajectory of the vehicle by controlling such systems such as a steering system 28, a braking system 30 and a suspension system 32 may be performed. Of course, other types of vehicle systems such as passenger restraint systems and the like may also be controlled by the vehicle system control circuit 26.

Improvements to previously known bounding box circuits provide more quick and accurate results by using of confidence scores for the two and three-dimensional sensors as well as a fusion or third confidence score that is a fusion of the two and three-dimensional confidence scores. In a sense, the following example checks false positives in three-dimensions by looking at the two-dimensional data.

Figure 2:
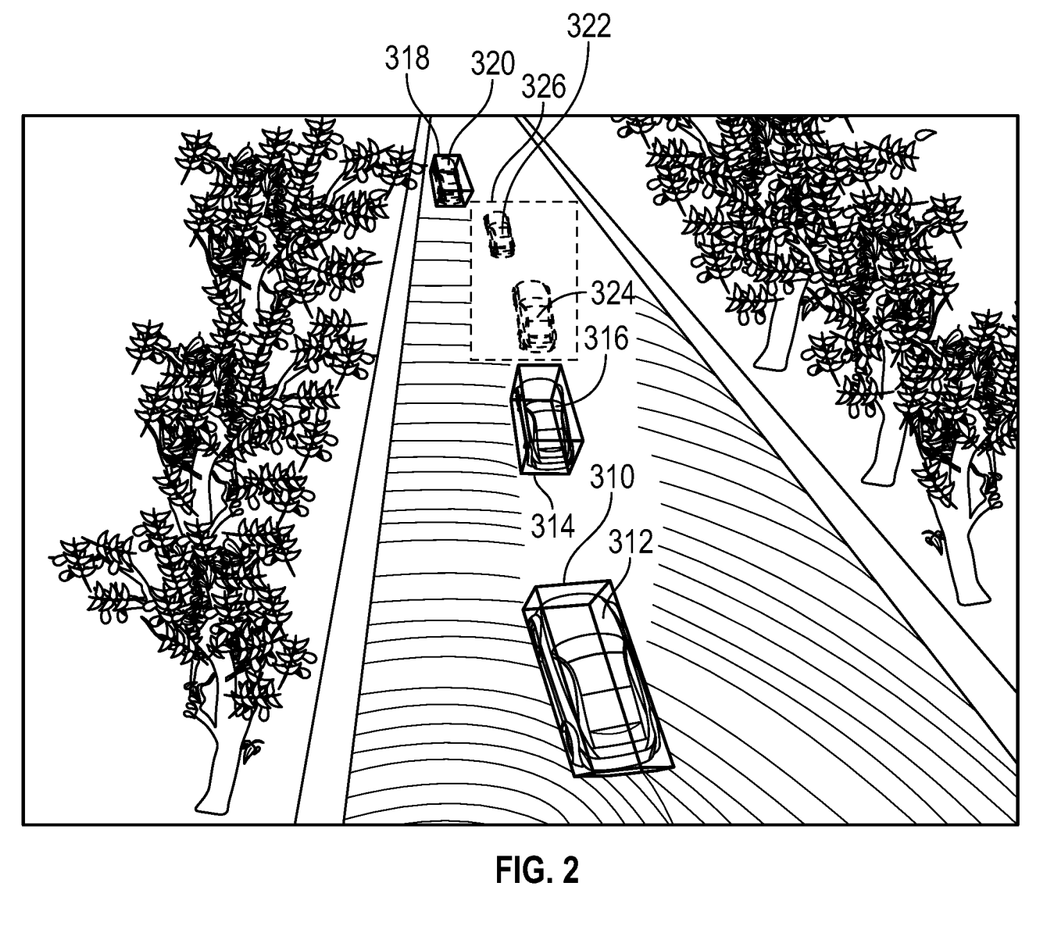
FIG. 2 is a representative view of a lidar-based bounding box output of a system.

Referring now to FIG. 2, a lidar only detector is used to form the bounding boxes 310 around an object 312, a bounding box 314 around an object 316 and a bounding box 318 around an object 320. In this example, the objects 312, 316 and 320 are vehicles. Another object 322 and yet another object 324 are surrounded by a box 326 to indicate a missed detection in the three-dimensional detection of FIG. 2.

Figure 3:
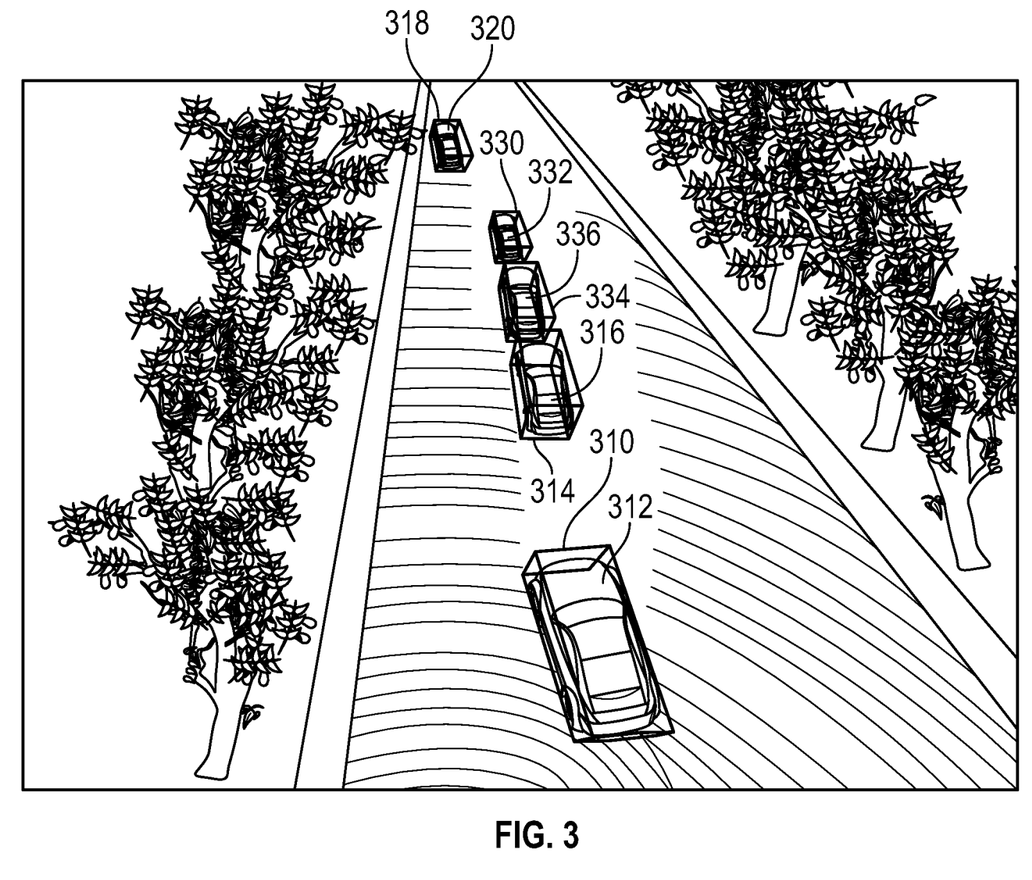
FIG. 3 is an output of bounding boxes provided by the present disclosure.

When comparing FIG. 2 to FIG. 3, a bounding box 330 is formed around the object 332 within the box. Another bounding box 334 is illustrated around an object 336. Each of the objects 332, 336 may be vehicles.

Figure 4A:
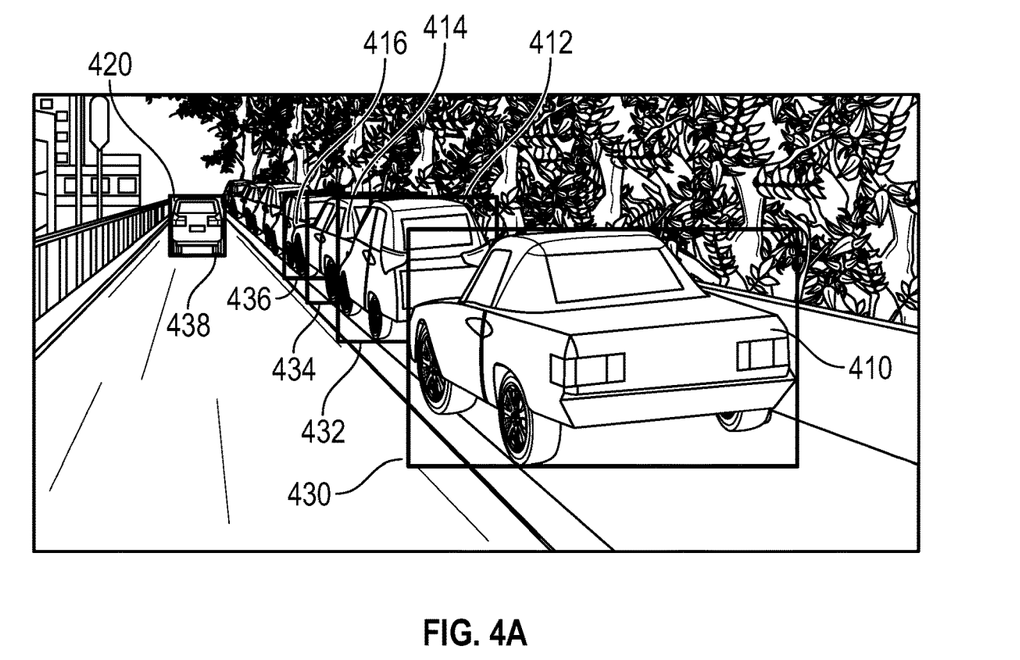
FIG. 4A is an image only two-dimensional bounding box representation of a view.
Figure 4B:
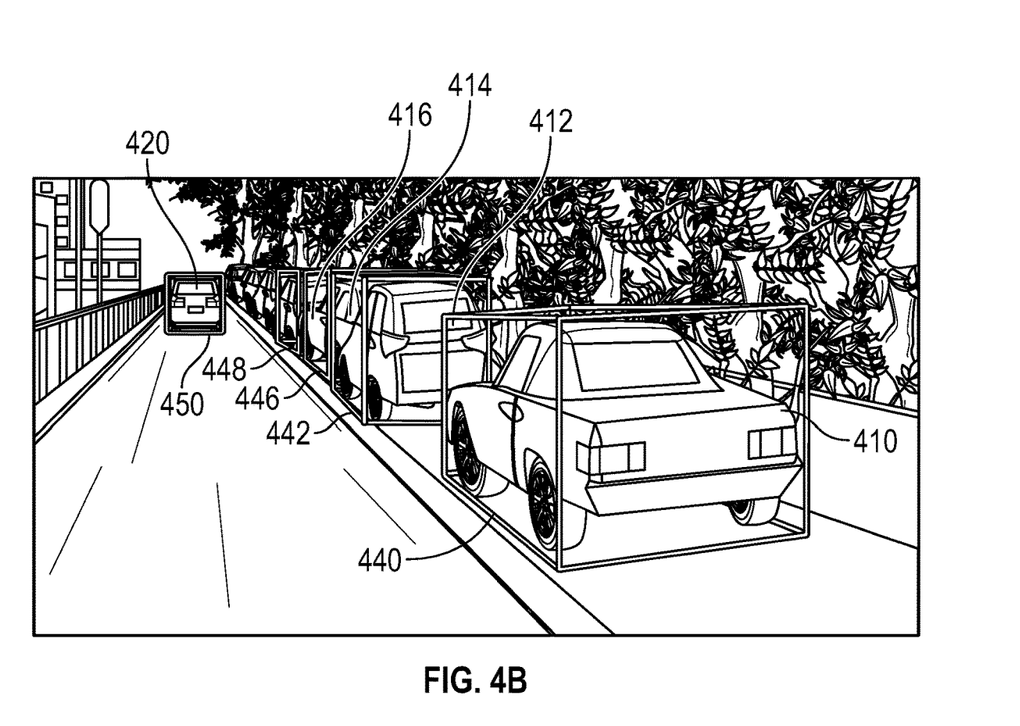
FIG. 4B is a bounding box representation using the present disclosure.

Referring now to FIGS. 4A and 4B, FIG. 4A shows a plurality of objects 410, 414, 416 and 420. The objects are surrounded by respective bounding boxes 430, 432, 434, 436 and 438. Because of the limited amount of data from an image only two-dimensional detector, a limited amount of information can be gleaned from the image data. In FIG. 4B, the objects are surrounded by three-dimensional bounding boxes 440, 442, 446, 448 and 450.

Figure 5A:
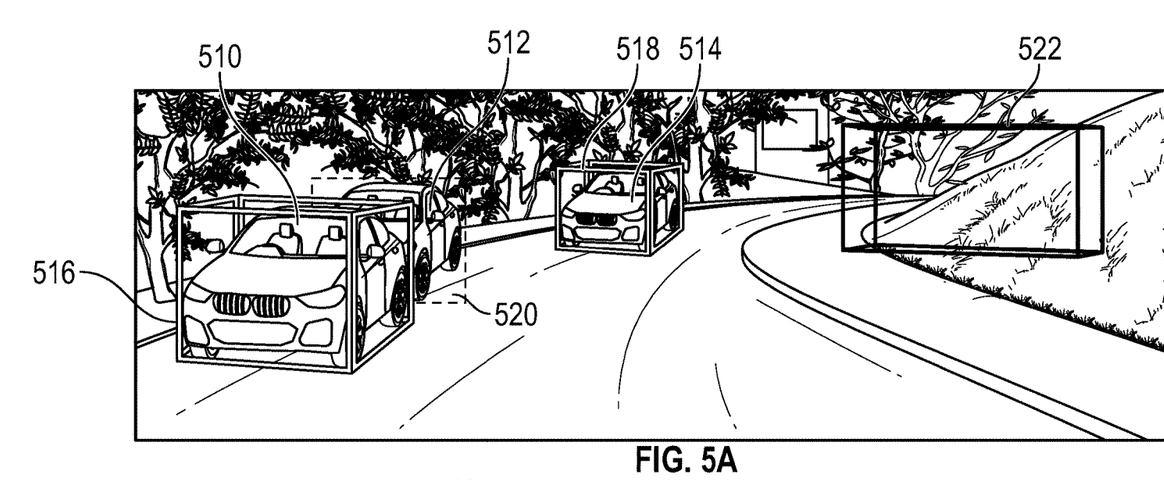
FIG. 5A is a lidar-only view.
Figure 5B:
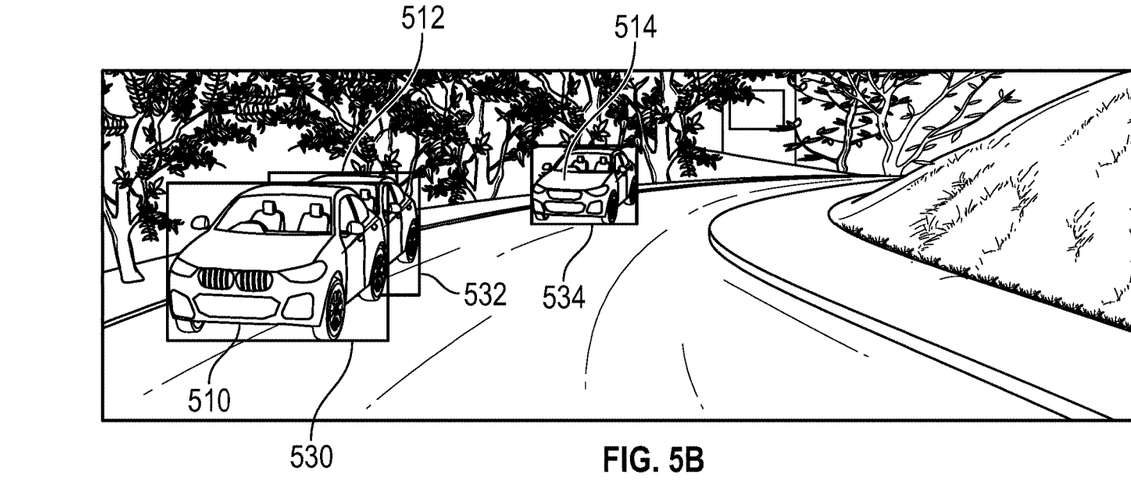
FIG. 5B is the bounding boxes from a two-dimensional sensor in the view of FIG. 5A.
Figure 5C:
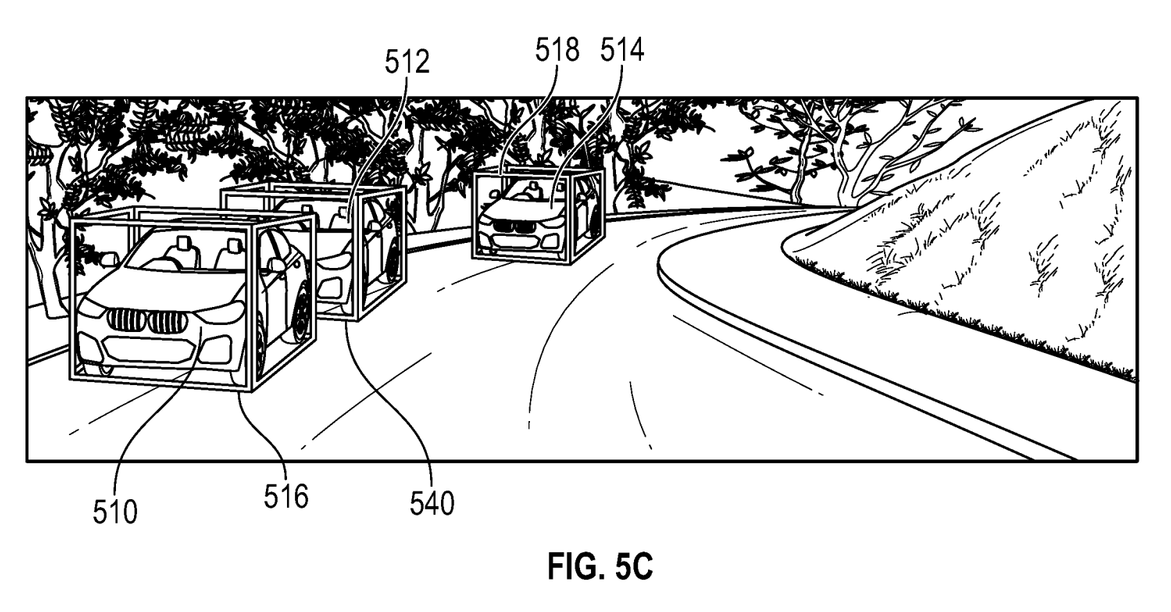
FIG. 5C is a view of the bounding boxes provided by the present disclosure.

Referring now to FIGS. 5A, 5B and 5C, another image having objects 510, 512 and 514 is set forth. In FIG. 5A, bounding boxes 516 and 518 are illustrated around the objects 510 and 518. A missed object 512 is surrounded by the dotted box 520. Likewise, a false/positive area has been recognized as an object surrounded by box 522.

The image only detector is used to process images in FIG. 5B. A plurality of two-dimensional boxes 530, 532 and 534 are illustrated around the objects 510, 512 and 514. By combining, using fusion set forth in further detail below, FIG. 5C illustrates three dimensional bounding boxes 516 and 518 from FIG. 5A around respective objects 510 and 514. However, the bounding box 522 of FIG. 5A has been eliminated because the two-dimensional sensor is used as a check. In this example, a bounding box 540 around object 512 improves the output of the system.

Sensor fusion has potential to address the shortcomings of video-only and LiDAR-only detections as illustrated above. Finding an effective approach that improves on the state-of-the-art single modality detectors has been difficult. In practice, LiDAR-only based methods typically outperform most of the fusion based methods as is evidenced in public test data. Fusion methods can be divided into three broad classes: early fusion, deep fusion and late fusion, each with their own pros and cons. While early and deep fusion have greatest potential to leverage cross modality information, they suffer from sensitivity to data alignment, often involve complicated architectures, and typically require pixel-level correspondences of sensor data. On the other hand, late fusion systems are much simpler to build as they incorporate pre-trained, single-modality detectors without change, an only need association at the detection level. The late fusion approach uses much-reduced thresholds for each sensor and combines detection candidates before Non-Maximum Suppression (NMS). By leveraging cross-modality information, it can keep detection candidates that would be mistakenly suppressed by single-modality methods.

In the present example, a Camera-LiDAR Object Candidates Fusion (CLOC) is used as a way to achieve improved accuracy for 3D object detection. The proposed architecture delivers the following contributions:

Versatility & Modularity: CLOC uses any pair of pre-trained 2D and 3D detectors without requiring re-training, and hence, can be readily employed by any relevant already-optimized detection approaches.

Probabilistic-driven Learning-based Fusion: CLOC are designed to exploit the geometric and semantic consistencies between 2D and 3D detections and automatically learns probabilistic dependencies from training data to perform fusion.

Speed and Memory: CLOC are fast, leveraging sparse tensors with low memory footprint, which only adds less than 3 ms latency for processing each frame of data.

Detection Performance: CLOC improves single-modality detectors, including state-of-the-art detectors, to achieve new performance levels. At time of submission, CLOC ranks the highest among all the fusion based methods.

The three main categories 3D object detection are based on (1) 2D images, (2) 3D point clouds and (3) both images and point clouds. Although 2D image-based methods are attractive for not requiring lidar, there is a large gap in 3D performance between these methods and those leveraging point clouds.

Point-cloud techniques currently lead in popularity for 3D object detection. Compared to multi-modal fusion based methods, single sensor setup avoids multi-sensor calibration and synchronization issues. However, object detection performance at longer distance is still relatively poor.

Figure 6:
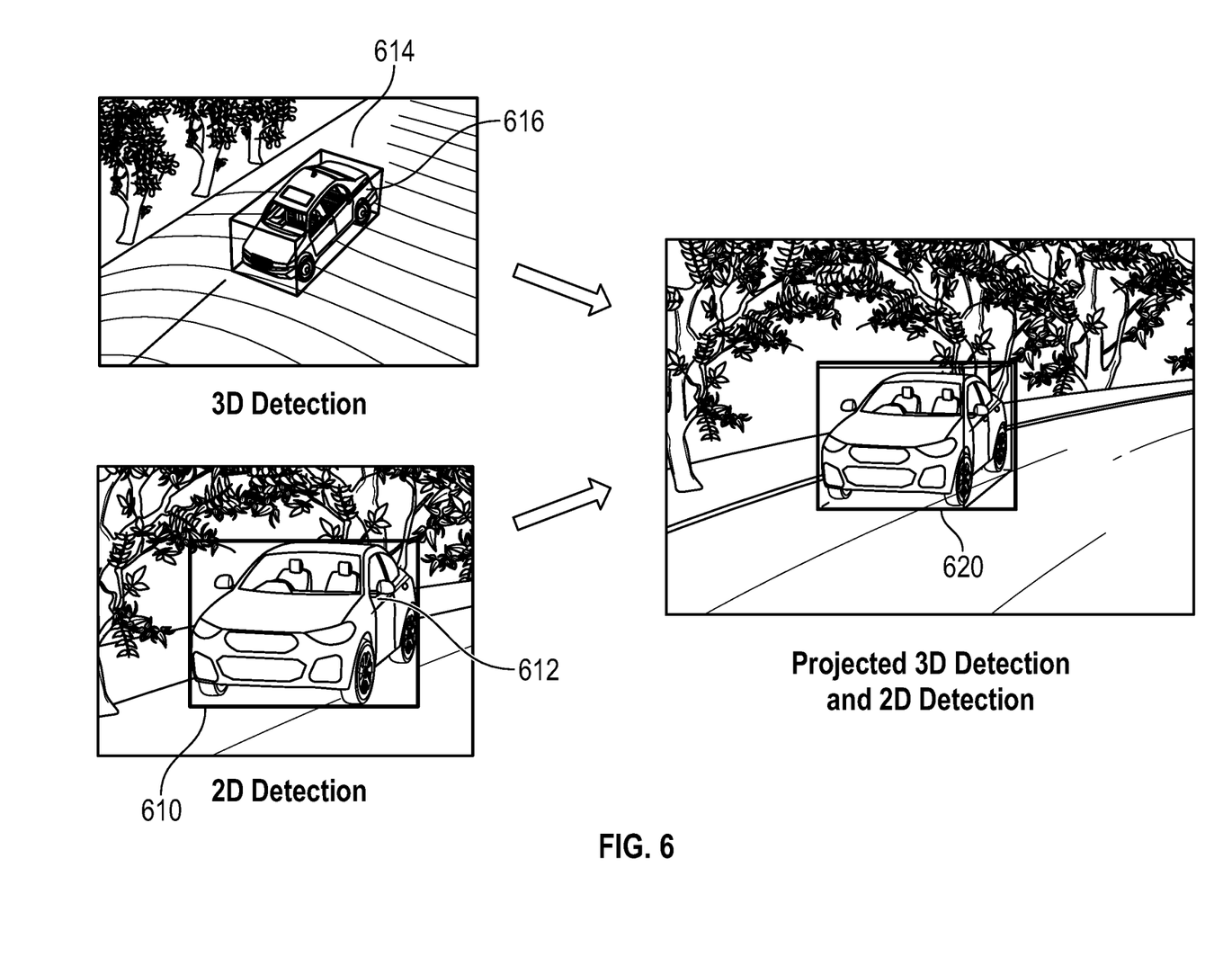
FIG. 6 is a 2D bounding box, a 3D bounding box and a combination of the 2D and 3D bounding boxes in a projected view.

Referring now to FIG. 6, camera-LiDAR fusion methods are used. The most common sensor setup for self-driving cars and thus the version 2D and 3D sensors are these respectively. In general, 2D detection systems discussed herein take RGB images as input, and output classified 2D axis-aligned bounding box 610 with confidence scores around an object 612 is shown in FIG. 6. The data of the 2D bounding box may be provided in a number of bas including providing two points corresponding to (X, Y) vales of two opposite corner. One corner and a height and width may also be provided. In the present example a rectangle is provided.

3D detection systems generate classified oriented a 3D bounding box 614 with confidence scores around an object is set forth In one example, only rotations in z axis is considered (yaw angle), while rotations in x and y axis is set to zero for simplicity. Using calibration parameters of the camera and LiDAR, the 3D bounding box in the LiDAR coordinate can be accurately projected into the image plane 620.

Fusion architectures can be categorized based on at what point during their processing features from different modalities are combined. Three general categories are (1) early fusion which combines data at the input, (2) deep fusion which has different networks for different modalities while simultaneously combining intermediate features, and (3) late fusion which processes each modality on a separate path and fuses the outputs in the decision level.

Early fusion has the greatest opportunity for cross-modal interaction, but at the same time inherent data differences between modalities including alignment, representation, and sparsity are not necessarily well-addressed by passing them all through the same network.

Deep fusion addresses this issue by including separate channels for different modalities while still combining features during processing. This is the most complicated approach, and it is not easy to determine whether or not the complexity actually leads to real improvements; simply showing gain over single-modality methods is insufficient.

Late fusion has a significant advantage in training; single modality algorithms can be trained using their own sensor data. Hence, the multi-modal data does not need to be synchronized or aligned with other modalities. Only the final fusion step requires jointly aligned and labeled data. Additionally, the detection candidate data that late fusion operates on is compact and simple to encode for a network. Since late fusion prunes rather than creates new detections, it is important that the input detectors be tuned to maximize their recall rate rather than their precision. In practice, this implies that individual modalities (a) avoid the NMS stage, which may mistakenly suppress true detections and (b) keep thresholds as low as possible.

In late fusion framework, all detection candidates before NMS in the fusion step to maximize the probability of extracting all potential correct detections. As set forth herein a discriminative network receives as input the output scores and classifications of individual detection candidates and a spatial description of the detection candidates. It learns from data how best to combine input detection candidates for a final output detection.

For a given frame of image and LiDAR data there may be many detection candidates of with various confidences in each modality from which a single set of 3D detections and confidence scores are sought. Fusing these detection candidates requires an association between the different modalities (even if the association is not unique). For this, a geometric association score was build and semantic consistency was applied. These are described in more detail as follows.

The image plane 620 has geometric consistency. An object that is correctly detected by both a 2D and 3D detector will have an identical bounding box in the image plane, see Fig whereas false positives are less likely to have identical bounding boxes. Small errors in pose will result in a reduction of overlap. This motivates an image-based Intersection over Union (IoU) of the 2D bounding box and the bounding box of the projected corners of the 3D detection, to quantify geometric consistency between a 2D and a 3D detection.

Detectors may output multiple categories of objects, but detections of the same category as associated during fusion. Thresholding detections at this stage (or use very low thresholds) are used. Thresholding is left to the final output based on the final fused score.

The two types of consistencies illustrated above is the fundamental concept used in our fusion network.

Figure 7:
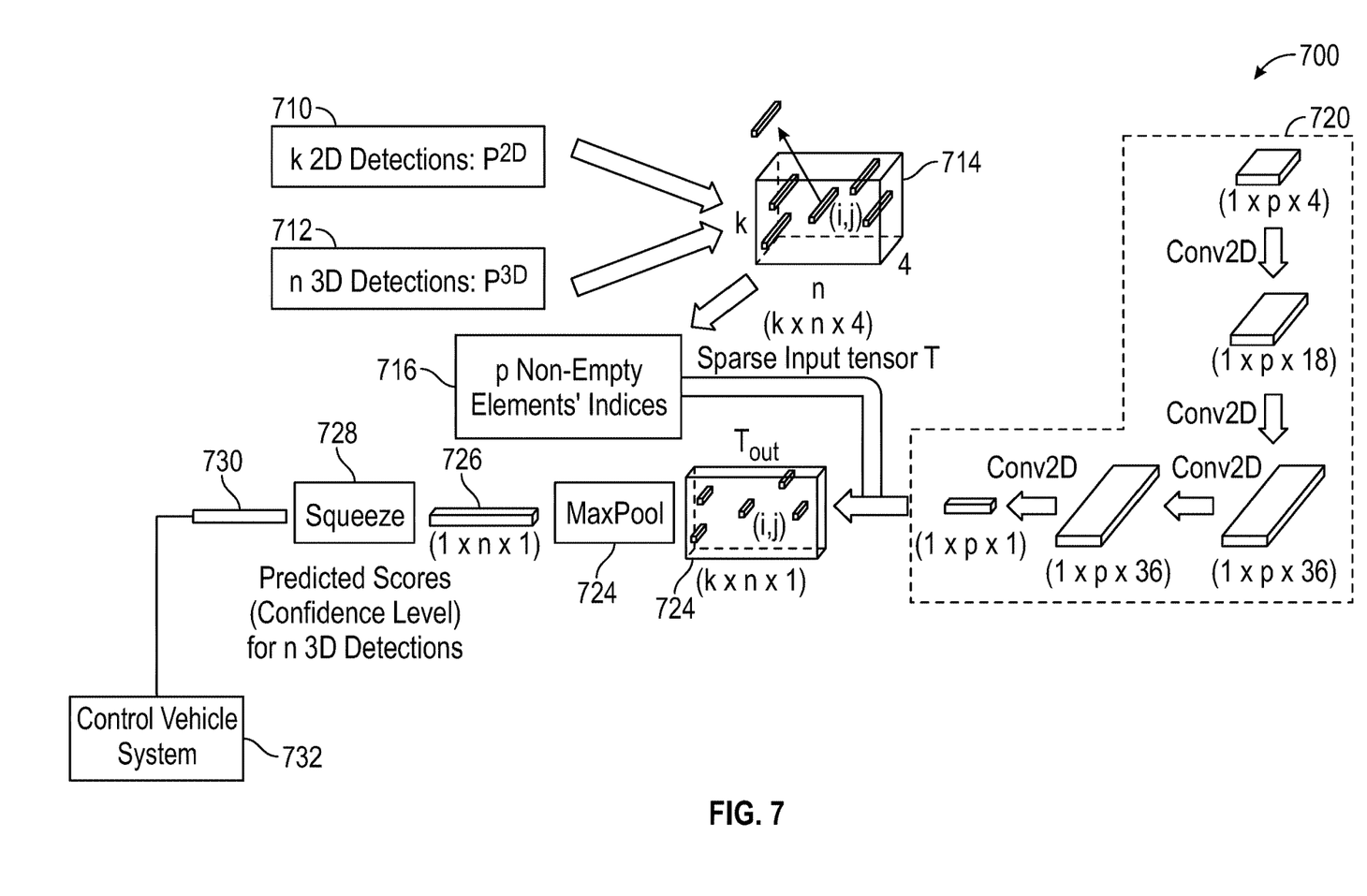
FIG. 7 is a flowchart schematic view of the operation of the present disclosure.

Referring now to FIG. 7, the preprocessing and encoding of the fused data, the fusion network 700 and the loss function used for training is set forth in further detail.

Two-dimensional object sensors (detectors) 710 generate the 2D detections. The system converts the individual 2D and 3D detection candidates into a set of consistent joint detection candidates which can be fed into the fusion network. The general output of a 2D object detector 710 are a set of 2D bounding boxes in the image plane and corresponding confidence scores. For k 2D detection candidates in one image can be defined as follows:

$$P^{2D} = \{p_1^{2D}, p_2^{2D}, \ldots, p_k^{2D}\},$$

$$P_i^{2D} = \{[x_{i1}, y_{i1}, x_{i2}, y_{i2}], s_i^{2D}\}$$

where, $P^{2D}$ is the set of all k detection candidates in one image, for $i_{th}$ detection $p_i^{2D}$, $x_{i1}$, $y_{i1}$ and $x_{i2}$, $y_{i2}$ are the pixel coordinates of the top left and bottom right corner points from the 2D bounding box in a four digit vector format and $s_i^{2D}$ is the confidence score.

3D object detectors 712 are used to generate n 3D detections which are oriented by bounding boxes in LiDAR coordinates and confident scores. There are multiple ways to encode the 3D bounding boxes, for example, a 7-digit vector containing 3D dimension (height, width and length), 3D location (x,y,z) and rotation θ (yaw angle) is used. For n 3D detection candidates in one LiDAR scan can be defined as follows:

$$P^{3D} = \{p_1^{3D}, p_2^{3D}, \ldots, p_n^{3D}\},$$

$$p_i^{3D} = \{[h_i, w_i, l_i, x_i, y_i, z_i, \theta_i], s_i^{3D}\}$$

where $P^{3D}$ is the set of all n detection candidates in one LiDAR scan, for $i_{th}$ detection $p_i^{3D}$, $[h_i, w_i, l_i, x_i, y_i, z_i, \theta_i]$ is the 7-digit vector for 3D bounding box. $s_i^{3D}$ is the 3D confidence score. The 2D and 3D detections are obtained in this example without doing non-maximum suppression (NMS). As discussed in the previous section, some correct detections may be suppressed because of limited information from single sensor modality. In this example the detection candidates from both sensor modalities are used to make better predictions. For k 2D detections and n 3D detections, a k×n×4 input tensor T is provided. For each element $T_{i,j}$, there are four channels denoted as follows:

$$T_{i,j} = \{IoU_{i,j}, s_i^{2D}, s_j^{3D}, d_j\}$$

where $IoU_{i,j}$ is the Intersection of Union (IoU) between $i_{th}$ 2D detection and $j_{th}$ projected 3D detection (expressed in this example as between 0 and 1, with 1 being a perfect overlap), $s_i^{2D}$ and $s_j^{3D}$ are the confident scores for $i_{th}$ 2D detection and $j_{th}$ 3D detection respectively. $d_j$ represents the normalized distance between the $j_{th}$ 3D bounding box and the LiDAR in xy plane. Elements $T_{i,j}$ with zero IoU are eliminated as they are geometrically inconsistent.

The input tensor T 714 is sparse because for each projected 3D detection, only few 2D detections intersect with it and so most elements are empty. The $i_{th}$ and the $j_{th}$ detections that have zero IoU are filled (i, j) in the tensor 714 and the other places are left empty. The fusion network 700 learns from the intersected examples. Because the raw predictions are taken before NMS, k and n are large numbers in each frame. It would be impractical to do 1×1 convolution on a dense tensor with this shape. In the present example, the sparsity of the input tensor T is used and the calculations are made much faster and feasible for large k and n values. Only non-empty elements are delivered to the rest fusion network 700 for processing. As discussed later, the indices of the non-empty elements (t, j) are important for further calculations, therefore the indices of these non-empty elements are saved in the cache 716. Here noted that for projected 3D detection $p_j$ that has no 2D detection intersected, the last element in $j_{th}$ column $T_{k,j}$ in T is filled with the available 3D detection information and set $IoU_{k,j}$ and $s_k^{2D}$ as −1. Because sometimes the 3D detector could detect some objects that 2D detector could not, the 3D detections are not discarded. Setting the IoU and $s^{2D}$ to −1 rather than 0 enables the network to distinguish this case from other examples with very small IoU and $s^{2D}$.

The fusion network 700 has a set 720 of 1 X p 2D convolution layers. Conv2D($c_{in}$, $c_{out}$, k, s) is used to represent a 2 dimensional convolution operator where $c_{in}$ and $c_{out}$ are the number of input and output channels, k and s are the kernel size vector and stride respectively. Four convolution layers sequentially as Conv2D(4, 18, (1,1), 1), Conv2D(18, 36, (1,1), 1), Conv2D(36, 36, (1,1), 1) and Conv2D(36, 1, (1,1), 1), which yields an output tensor of size 1×p×1 where p is the number of non-empty elements in the input tensor T. Note that for the first three convolution layers, after each convolution layer applied, a rectified linear unit ReLU is used. The indices of the non-empty elements (t, j) is used to determine an output tensor $T_{out}$ of shape k×n×1 that is built by filling p outputs based on the indices (t, j) and putting negative infinity elsewhere. Finally, the output tensor $T_{out}$ 724 is mapped to the desired learning targets, a probability score map 726 of size 1×n is determined through maxpooling 724 (MaxPool) in the first dimension. Ultimately, a third confidence level 730 is provided by squeezing the MaxPool values in a squeeze function 728. The third confidence level 730 may be referred to as a fusion confidence of the output after squeezing. The generating of the third confidence score for the object based is thus based on the first sensor data and the second sensor data corresponding to the object. The first sensor data, the second sensor data and the third confidence score are used to control operation of a vehicle system in 732.

A cross entropy loss for target classification, modified by the focal loss with parameters α=0.25 and γ=2 may be used to address the large class imbalance between targets and background.

The fusion network 700 is trained using stochastic gradient descent (SGD). The Adam optimizer was with an initial learning rate of $3*10^{-3}$ and decay the learning rate by a factor of 0.8 for 15 epochs.

All of the detected and undetected objects have a probability, cost or weight associated therewith. By performing a reduction of the data set, faster processing of the data is performed. The reduced data set is ultimately communicated to various vehicles systems including but not limited to a steering system, braking system and suspension system. Thus, the various types of systems for the vehicle may be controlled based upon the multiple object tracking set forth above.

The term probability may include an actual probability of an event, a confidence score, a weighting and a cost (which is merely an inverse of the probability).

The techniques described herein may be implemented by one or more computer programs executed by one or more processors. That is the processor is programmed to perform the various steps. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   generating first sensor data for an object comprising a first bounding box from a first sensor, said first bounding box comprising a two-dimensional bounding box, said first sensor data comprising a first confidence score;
   generating second sensor data for the object comprising a second bounding box from a second sensor different than the first sensor, said second sensor data comprising a second confidence score, said second bounding box comprising a three-dimensional bounding box and being different than the first bounding box;
   generating a third confidence score for the object based on the first sensor data and the second sensor data corresponding to the object by
      forming a first input tensor comprising an intersection over union (IoU), the first confidence score, the second confidence score and a distance from the first sensor,
      after forming the first input tensor, performing at least one convolution and forming an output tensor therefrom,
      maxpooling the output tensor to obtain maxpool values, and
      after maxpooling, using a squeezing function to squeeze the maxpool values to obtain the third confidence score; and
   utilizing the first sensor data, the second sensor data and the third confidence score to control operation of a vehicle system.

2. The method of claim 1 wherein the first sensor comprises a two-dimensional sensor.

3. The method of claim 2 wherein the first sensor data comprises a first coordinate for a first corner, and a second coordinate for a second corner.

4. The method of claim 2 wherein the second sensor comprises a two-dimensional sensor.

5. The method of claim 2 wherein the second sensor comprises a three-dimensional sensor.

6. The method of claim 2 wherein the first sensor comprises a camera and the second sensor comprises lidar.

7. The method of claim 1 wherein the distance comprises a normalized distance.

8. The method of claim 1 wherein the third confidence score comprises a fused score.

9. A method comprising;
   generating two-dimensional sensor data for an object from a two-dimensional sensor, said two-dimensional sensor data comprising at least a first corner and second corner of a first bounding box and a first confidence score, said first bounding box comprising a two-dimensional bounding box;
   generating three-dimensional sensor data for the object from a three-dimensional sensor comprising a third corner of a second bounding box, a height, width and length of the second bounding box and a second confidence score, said second bounding box comprising a three-dimensional bounding box and being different than the first bounding box;
   generating a third confidence score for the object based on the two-dimensional sensor data and the three-dimensional sensor data by
      forming a first input tensor comprising an intersection over union (IoU), the first confidence score, the second confidence score and a distance from the two-dimensional sensor,
      after forming the first input tensor, performing at least one convolution and forming an output tensor therefrom,
      maxpooling the output tensor to obtain maxpool values, and
      after maxpooling, using a squeezing function to squeeze the maxpool values to obtain the third confidence score; and
   utilizing the two-dimensional sensor data, the three-dimensional sensor data and the third confidence score to control operation of a vehicle system.

10. A method of claim 9 wherein the two-dimensional sensor comprises a camera and the three-dimensional sensor comprises a lidar sensor.

11. A system comprising:
   a first sensor generating first sensor data for an object comprising a first bounding box from a first sensor, the first sensor data comprising a first confidence score, said first bounding box comprising a two-dimensional bounding box;
   a second sensor generating second sensor data for the object comprising a second bounding box from a second sensor different than the first sensor, the second sensor data comprising a second confidence score, said second bounding box comprising a three-dimensional bounding box and being different than the first bounding box;
   a bounding box circuit programmed to
      generate a third confidence score for the object based on the first sensor data and the second sensor data by being programmed to
      form a first input tensor comprising an intersection over union (IoU), the first confidence score, the second confidence score and a distance from the first sensor,
      thereafter, perform at least one convolution and forming an output tensor therefrom,
      maxpool the output tensor to obtain maxpool values, and
   thereafter, use a squeezing function to squeeze the maxpool values to obtain the third confidence score; and
      utilize the first sensor data, the second sensor data and the third confidence score to control operation of a vehicle system.

12. The system of claim 11 wherein the bounding box circuit generates a fused score as the third confidence score.

* * * * *